(12) United States Patent
Ganesan et al.

(10) Patent No.: US 6,297,974 B1
(45) Date of Patent: Oct. 2, 2001

(54) METHOD AND APPARATUS FOR REDUCING STRESS ACROSS CAPACITORS USED IN INTEGRATED CIRCUITS

(75) Inventors: Ramkarthik Ganesan, Fair Oaks; Owen W. Jungroth, Sonora, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/405,977

(22) Filed: Sep. 27, 1999

(51) Int. Cl.$^7$ .............................. H02M 3/18; H01G 9/10; G11C 7/00
(52) U.S. Cl. .............................. 363/60; 327/536; 365/226
(58) Field of Search .................................. 363/60, 59, 56; 327/536, 156, 537, 306; 307/296.1, 296.2, 296.3; 365/218, 226

(56) References Cited

U.S. PATENT DOCUMENTS

| 5,008,799 | 4/1991 | Montalvo . | |
|---|---|---|---|
| 5,059,815 | 10/1991 | Bill et al. . | |
| 5,422,586 | * | 6/1995 | Tedrow et al. ........................ 327/306 |
| 5,546,031 | * | 8/1996 | Seesink ................................. 327/155 |
| 5,612,921 | 3/1997 | Chang et al. . | |
| 5,973,979 | 10/1999 | Chang et al. . | |

FOREIGN PATENT DOCUMENTS

| 0772282A1 | 5/1997 | (EP) . |
|---|---|---|
| WO9628850A | 9/1996 | (WO) . |

* cited by examiner

Primary Examiner—Rajnikant B. Patel
(74) Attorney, Agent, or Firm—Blakely, Sokoloff, Taylor & Zafman LLP

(57) ABSTRACT

A method, apparatus, and system for controlling the voltage levels across capacitors coupled between a first node and a second node of an integrated circuit so that the voltage levels across these capacitors will not exceed the breakdown voltage limitation of these capacitors. The voltage level between the first and second nodes of the integrated circuit can vary from a second voltage level to a first voltage level when the integrated circuit transitions from a second power state to a first power state, respectively. A first capacitor and a second capacitor are connected in series between the first and second nodes of the integrated circuit forming a middle node between the first and second capacitors. The voltage level of the middle node is set to a third voltage level when the integrated circuit is placed in the first power state such that the voltage level between the first and middle nodes does exceed the breakdown voltage of the first capacitor and the voltage level between the middle and second nodes does not exceed the breakdown voltage of the second capacitor.

24 Claims, 7 Drawing Sheets

METHOD AND APPARATUS FOR REDUCING STRESS ACROSS CAPACITORS USED IN INTEGRATED CIRCUITS

FIELD OF THE INVENTION

The present invention relates to the voltage control in integrated circuits and devices. More specifically, the present invention relates to an apparatus, method, and system for controlling the voltage levels across the various capacitors used in integrated circuits so that the voltage levels across these capacitors do not exceed the stress limitation or breakdown voltage limitation of these capacitors.

BACKGROUND OF THE INVENTION

As integrated circuits and systems continue to advance and become more complex, effective and efficient power and thermal management of the integrated circuits and systems have become more and more critical in circuit design and implementation. In order to reduce the power consumption in integrated circuits and systems, these circuits and systems have been designed to operate at lower voltage levels. For example, integrated circuits and systems have been designed to operate at voltage levels such as 5 volts, 3.3 volts, or less provided by the power supply. However, some components or circuitry in these integrated circuits or systems require higher voltages to operate or function. For instance, flash electrically erasable programmable read only (flash EEPROM) memory devices that are used in computers or systems typically require voltage levels that are higher than that provided by the power supply to perform various operations such as read, erase, or programming operations. In order to generate the voltage levels required by the flash memory that is higher than that provided by the power supply, charge pump circuits are typically used to generate a higher voltage level from a lower voltage level source. Charge pump circuits typically contain multiple pump stages that are used to increase a lower voltage input to a higher voltage output through incremental voltage increase at each stage. Each of the multiple pump stages in the charge pump circuits typically uses one or more capacitors for storing and transferring charge to the next pump stage in order to increase the voltage level from one stage to the next stage. However, the required voltage levels at some stages, especially the final stages of the charge pump circuit, can exceed the stress or breakdown voltage limitation of a single capacitor used for storing and transferring charge. If the stress or breakdown voltage limitation of the single capacitor is exceeded, the maximum voltage level generated at those pump stages will be limited. To overcome this problem, two or more capacitors can be connected in series to reduce the voltage across each of the capacitors. Connecting two or more capacitors in series is also referred to as the stacked capacitor configuration. However, using two or more capacitors connected in series increases the die area of the charge pump circuit. Therefore it is not desirable to use any more capacitors in the charge pump circuit than the number that is required for the circuit to function properly. Moreover, in many charge pump circuits, the output node of the charge pump circuit can be driven from one voltage level that is required for one type of flash memory operation to another voltage level that is required for another type of flash memory operation resulting in a total voltage sweep that is greater than the breakdown voltage of each capacitor connected in series. For example, an output node of a negative charge pump circuit can go all the way down to −15 volts when the negative charge pump is running to +11 volts when it stops and gets initialized to a proper internal signal. In this instance, the total voltage sweep is 26 volts, which can be greater than the total maximum voltage that can be endured by the two capacitors connected in series.

Accordingly, there exists a need to effectively and efficiently balance the performance requirements, the power usage requirements, and the die areas of the charge pump circuits so that the required output voltage can be achieved without exceeding the stress limits of the capacitors used in the charge pump circuits and without unnecessary increase in the die area.

SUMMARY OF THE INVENTION

A method, apparatus, and system for controlling the voltage levels across capacitors coupled between a first node and a second node of an integrated circuit so that the voltage levels across these capacitors will not exceed the breakdown voltage limitation of these capacitors. The voltage level between the first and second nodes of the integrated circuit can vary from a second voltage level to a first voltage level when the integrated circuit transitions from a second power state to a first power state, respectively. A first capacitor and a second capacitor are connected in series between the first and second nodes of the integrated circuit forming a middle node between the first and second capacitors. The voltage level of the middle node is set to a third voltage level when the integrated circuit is placed in the first power state such that the voltage level between the first and middle nodes does exceed the breakdown voltage of the first capacitor and the voltage level between the middle and second nodes does not exceed the breakdown voltage of the second capacitor.

BRIEF DESCRIPTION OF THE DRAWINGS

The features and advantages of the present invention will be more fully understood by reference to the accompanying drawings, in which.

DETAILED DESCRIPTION

In the following detailed description numerous specific details are set forth in order to provide a thorough understanding of the present invention. However, it will be obvious to one skilled in the art that the present invention may be understood and practiced without these specific details.

In the discussion below, the teachings of the present invention are utilized to implement a method and apparatus for dynamically controlling the voltage level across the capacitors used in an integrated circuit so that the breakdown voltage of each individual capacitor will not be exceeded. In addition, the teachings of the present invention are also utilized to implement a method and an apparatus to effectively and efficiently balance between the performance requirements with respect to the output voltage levels, the stress or voltage breakdown limitations on the capacitors, and the die area of the integrated circuit. In one embodiment, the maximum voltage across a first node and a second node in the integrated circuit is determined. In one embodiment, the voltage across the first node and the second node can vary from a first level to a second level as the integrated circuit transitions from a first power state to a second power state, respectively. If the maximum voltage is greater than the breakdown voltage level of a single capacitor of a first type, at least two capacitors of the first type are connected in series between the first node and the second node of the integrated circuit to reduce the voltage level across each single capacitor. In one embodiment, the intermediate node between the first and second capacitors is connected to a reference voltage source when the integrated circuit is in the second power state and is disconnected from the reference voltage source when the integrated circuit is in the first power state.

The teachings of the present invention are applicable to any charge pump circuit used to produce a higher voltage level than that of the power supply. However, the present invention is not limited to charge pump circuits and can be applied to other integrated circuits and systems in which the required voltage across a single capacitor can be greater than the breakdown voltage limitation of the respective capacitor.

Figure 1:
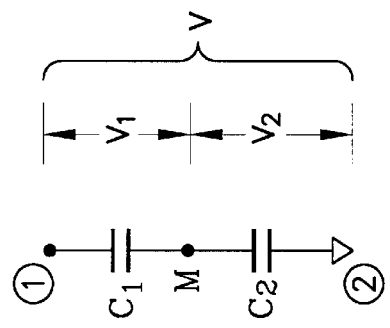
FIG. 1 shows a single capacitor configuration.
Figure 2:
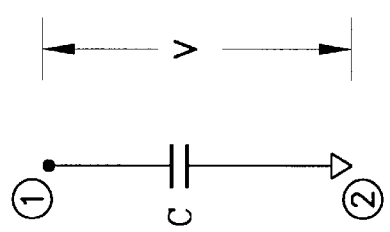
FIG. 2 shows a stacked capacitor configuration with two capacitors connected in series.

FIG. 1 shows a single capacitor configuration in which a single capacitor C is connected between two nodes in an integrated circuit, for example in a charge pump circuit, for storing and transferring charge. In this example, it is assumed that the voltage V at node 1 (i.e., the voltage across the capacitor C) can raise to a level that exceeds the stress limitation or the breakdown voltage of the capacitor C. To avoid this problem, a stacked capacitor configuration as shown in FIG. 2 can be used to reduce the stress across the individual capacitors that are connected in series. As shown in FIG. 2, two capacitors C1 and C2 can be connected in series in order to reduce the stress across each individual capacitor. In this configuration, the voltage across C1 (between node 1 and the middle node M) is referred to as V1 and the voltage across C2 (between the middle node M and ground level) is referred to as V2. The voltage V across the two capacitors C1 and C2 will be the algebraic sum of the voltages on the individual capacitors:

$$V=V1+V2$$

The reciprocal of the equivalent capacitance of the capacitor C in FIG. 1 is equal to the sum of the reciprocals of the individual capacitances of capacitors C1 and C2 in FIG. 2 as follows:

$$1/C=1/C1+1/C2$$

In one embodiment, the voltage V is preferably split equally across the two capacitors C1 and C2 to equalize the stress across each individual capacitor. Thus:

$$V1=V2=V/2$$

$$C1=C2=2C$$

For example, assuming that Vmax=−15 volts. It then follows that V1=V2=−7.5 volts.

Figure 3:
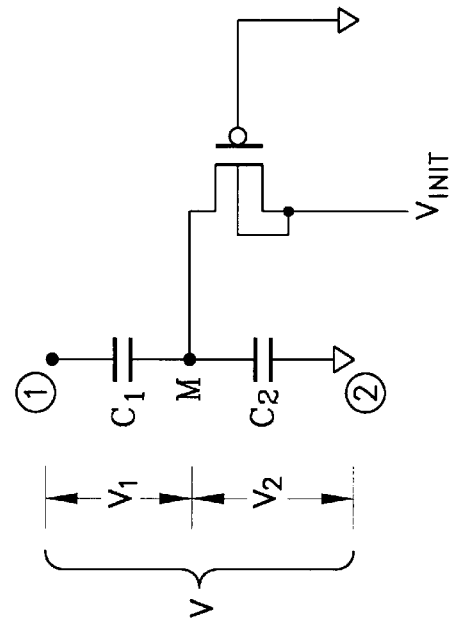
FIG. 3 shows a stacked capacitor configuration with a voltage control mechanism to prevent the transient stress across the capacitors.

FIG. 3 illustrates a stacked capacitor configuration in which the voltage level at the middle node M can be dynamically controlled to avoid the transient stress across the capacitors. The transient stress can exceed the stress limitations of the individual capacitors even in a stacked capacitor configuration. The transient stress can occur as the voltage level V can change from one level when the integrated circuit is in one power state to another level when the circuit is in another power state. For example, assuming that node 1 in FIG. 3 is an output node of the last pump stage in a negative charge pump that is designed to generate a negative voltage level of −15 volts for flash memory erase or programming operations. Assuming also that C1=C2=2C and V1=V2=V/2. Node 1 is also assumed to be connected to an output node of another charge pump circuit that is designed to generate a sufficient positive voltage level for certain flash memory operations, for example program operation. In this instance, the voltage level at node 1 can go from a negative voltage level of −15 volts when charge pump circuit is running to +11 volts when it stops and is initialized to a proper internal signal. Assuming that the stress limitation or breakdown voltage level of each capacitor in FIG. 3 is −12.5 volts. In this example, the total voltage sweep is 26 volts when node 1 goes from −15 volts to +11 volts with the middle node exceeding the stress limit of −12.5 volts. The stacked configuration as shown in FIG. 2 therefore does not totally solve the stress limit problem when there is a transient stress as described above.

FIG. 3 illustrates a stacked capacitor configuration with a voltage control mechanism to overcome the transient stress problem described above. As shown in FIG. 3, the middle node M between capacitor C1 and capacitor C2 is coupled to a control device 311 that is connected to a voltage source Vinit. In one embodiment, the control device 311 operates as a switch and is switched on or off based upon an input control signal 321. In one embodiment, the input control signal 321 is set to a first value when the circuit is in a first power state (e.g., a low power state) and set to a second value when the circuit is in a second power state (e.g., a high power state). In one embodiment, the control device 321 is switched on when the control signal 321 is set to the first value (e.g., a positive voltage) to connect the middle node M to the voltage source Vinit. The control device 321 is switched off when the control signal 321 is set to the second value (e.g., ground) to disconnect or isolate the middle node M from the voltage source Vinit. Therefore, by controlling the voltage level at the middle node M, the voltage level across the individual capacitors can be reduced below the breakdown voltage level or stress limitation of the individual capacitors even when there is a transient stress. In one embodiment, the voltage Vinit is set to the same voltage level at the upper node 1 of the stacked capacitor configuration shown in FIG. 3 when the circuit transitions from one state to another state that causes a transient stress as described above. In this instance, since the middle node is set to Vinit which is the same voltage level as the upper node 1 when the circuit is transitioned to the first power state (e.g., shut down), the voltage level V1 across the capacitor C1 will be V(node1)−V(node1)=0. The voltage level V2 across the capacitor C2 will be V(node1)−ground=V(node1). According to the example described above, V(node1) will be +11 volts at the peak of the transition and lowered to another voltage level, for example +5 volts after the circuit is stabilized after the transition. Thus the voltage level across C1 and the voltage level across C2 will be lower than the breakdown voltage level (e.g., 12.5 volts) of each respective capacitor in the stacked configuration. While the present invention is described using specific examples and numbers for illustration purposes, it will be appreciated and understood by one who is skilled in the art that the teachings of the present invention are fully applicable to other configurations, variations, and embodiments of stacked capacitor configuration. For example, the voltage V can be split across the individual capacitors by any ratios so long as the voltage level across each individual capacitor does not exceed the breakdown voltage level of the respective capacitor. In addition, the voltage Vinit can be set to some voltage levels other than the voltage at node 1 so long as the transient stress across each individual capacitor does not exceed the stress limitation or breakdown voltage level of the respective capacitor. Furthermore, in alternative embodiments, the Vinit can also operate as both the voltage source and the control signal to the control device 311, thus eliminating the need of having a separate control signal 321. For example, the Vinit when set to one level (e.g., ground) will turn off the control device 311 thus disconnecting or isolating the middle node M from the Vinit. The Vinit when set to another level (e.g., +11 volts or 5 volts, etc,) will cause the control device 311 to turn on to connect the middle node to Vinit.

Figure 4:
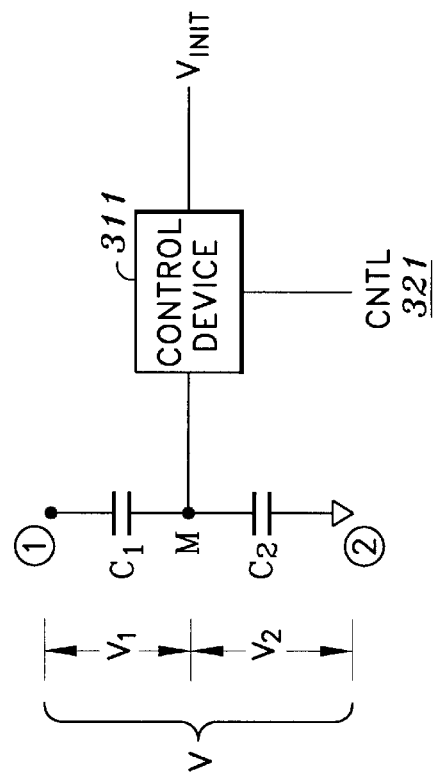
FIG. 4 shows a stacked capacitor configuration using a transistor as the voltage control mechanism.

FIG. 4 shows a diagram of one embodiment of a stacked capacitor configuration using a P-type transistor device 411 as the control device 311 to control the voltage level at the middle node when the circuit transitions from one state to another state which causes a transient stress across the capacitors as described above. In one embodiment, the gate of the transistor 411 is connected to ground level. The middle node M of the stacked capacitors is connected to the drain terminal of the transistor 411. The NWELL is coupled to Vinit which is set to one level (e.g., ground) when the circuit is in one state (e.g., high power state) and set to another level (e.g., voltage level at node 1) when the circuit is in another state (e.g., low power state). In this embodiment, the transistor 411 operates as a switching transistor to connect the middle node M to or disconnect the middle node M from the Vinit, based upon the voltage level of Vinit. Thus, when the circuit is in the second power state (e.g. running), Vinit is set to ground to switch off the transistor 411 thus isolating or disconnecting the middle node M from Vinit. When the circuit is in the first state (e.g., shut down), Vinit is set to a voltage level corresponding to the voltage level of the upper node 1 to switch on the transistor 411 thus setting the voltage level at the middle node M to the same level of Vinit and the upper node 1.

Figure 5:
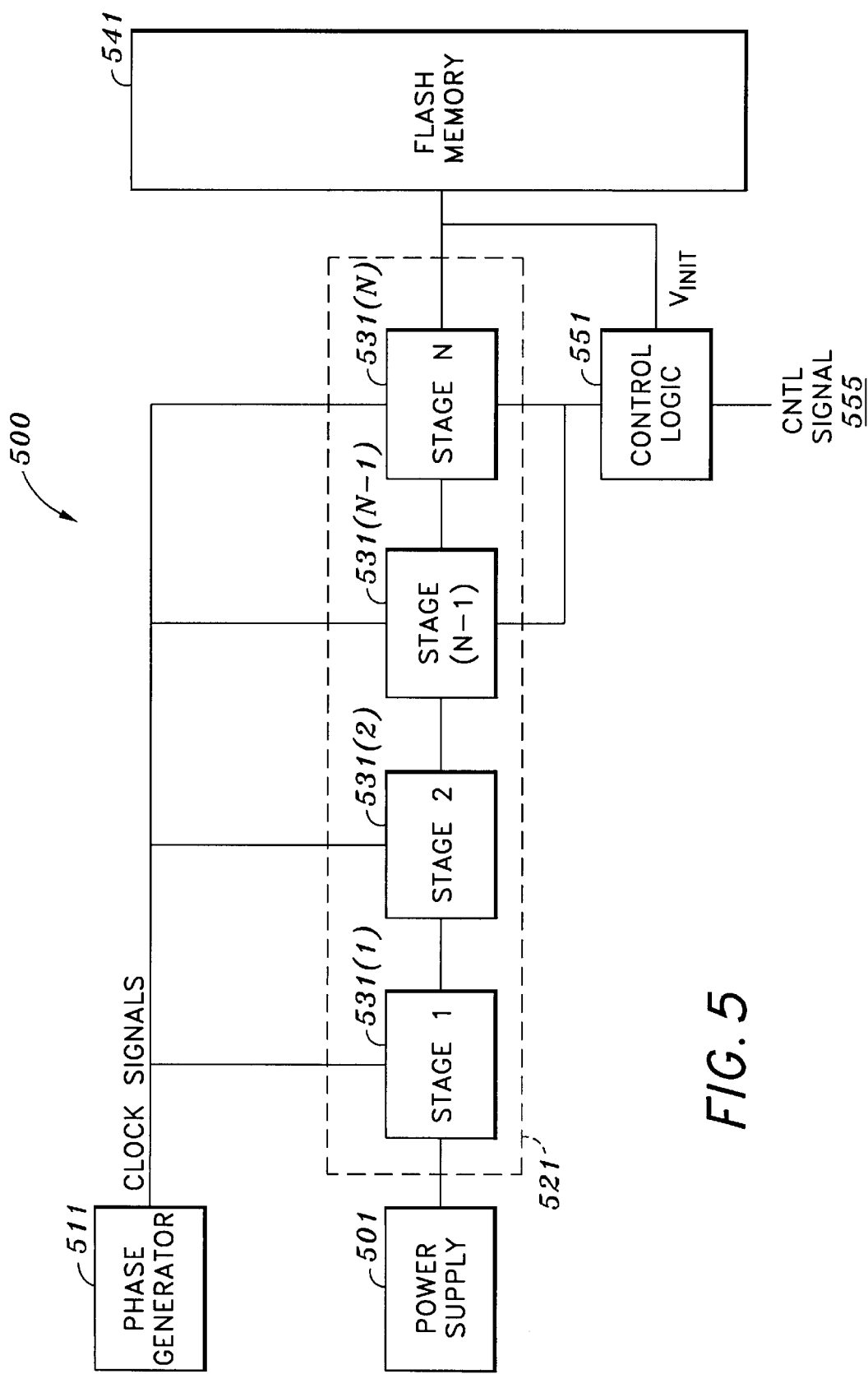
FIG. 5 is a block diagram of one embodiment of a system implementing the teachings of the present invention.

FIG. 5 shows a block diagram of one embodiment of a system according to the teachings of the present invention. The system 500 includes a power supply 501, a phase generator 511, and a charge pump circuit 521 including a plurality of pump stages 531, a flash memory device 541, and a voltage control device 551. The power supply 501 is coupled to the charge pump circuit 521 to provide the input voltage and current to the charge pump circuit 521. The charge pump circuit 521, in this embodiment, includes a plurality of pump stages connected in series. The output node of each pump stage is connected to the input node of the next pump stage to increase the low input voltage level from the power supply to a higher voltage level that is required for certain operations of the flash memory device 541. In one embodiment, the input node of the first pump stage 531(1) is connected to receive the input voltage and current from the power supply 501. In one embodiment, the output of the last pump stage 531(N) is connected to the flash memory device 541 to provide the required voltage and current level to the flash memory device 541. As explained above, the flash memory device 541 requires a higher voltage level than that of the power supply 501 to perform certain operations such as erase or program operations. The phase generator 511 is coupled to the charge pump circuit 521 to provide the necessary clock signals for each pump stage to function properly. In the present specification, the charge pump circuit 521 is assumed to be a negative charge pump circuit even though everything discussed herein is equally applicable to positive charge pump circuits. Likewise, the teachings of the present invention equally apply to other integrated circuits in which the voltage between two nodes of the circuits may exceed the stress limitation or breakdown voltage level of a single capacitor. The input voltage from the power supply 501 is increased serially through each pump stage of the charge pump circuit 521 in order to generate the higher required voltage level at the output node of the charge pump circuit 521. In one embodiment, for purposes of explanation and illustrations, it is assumed that there are two different types of capacitors that can be used for the storing and transferring of charge in the charge pump circuit 521 even though it should be understood and appreciated by one skilled in the art that everything discussed herein equally applies to other circuit arrangements and configurations that use only one type of capacitor or more than two different types of capacitors. In one embodiment, either ONO capacitors (poly2/poly1 sandwich with Oxide-Nitride-Oxide) or MOS (metal-oxide-semiconductor) capacitors can be used for the pump stages. For purposes of illustrations and explanations, it is assumed that the output voltage of the charge pump circuit 521 will be approximately –15 volts. The output node of the charge pump circuit 521, as described above with respect to FIGS. 3 and 4, can go from a negative voltage of –15 volts when the charge pump circuit 521 is running to +11 volts when the charge pump circuit 521 stops and gets initialized to a proper voltage level, for example 5 volts. Thus there is a total voltage sweep or transient stress of 26 volts as the charge pump circuit goes from one state (e.g., the running or full power state) to another state (e.g., shut down or power off state). In one embodiment, the ONO capacitors used in the charge pump circuit 521 are assumed to have the stress limitation or breakdown voltage level of about –12.5 volts. Consequently, the voltage across each single ONO capacitor should not exceed –12.5 volts. In the present discussion, the MOS capacitors can withstand a higher stress (e.g., –15.5 volts) than ONO capacitors but they would still not be able to withstand the –26 volts stress requirement by the negative charge pump circuit 521. The MOS capacitors, however, have larger die area than the ONO capacitors. In one embodiment, the control logic 551 (also referred to as voltage initialization and control) is coupled to the output node of the charge pump circuit 521 and to the last two pump stages 531 (N–1) and 531(N). In this embodiment, it is assumed that the output voltages at the last two stages exceed the stress limitation or breakdown voltage level of a single capacitor and therefore a stacked capacitor configuration as described above is used in the last two pump stages in order to reduce the stress across each individual capacitor used in the last two pump stages. In one embodiment, the stacked capacitor configuration used in the last two pump stages of the charge pump circuit 521 includes two ONO capacitors connected in series. Single capacitor configuration is used in other pump stages where the voltage level does not exceed the stress limitation of a single capacitor. Either ONO or MOS capacitors can be used in the single capacitor configuration. In one embodiment, as shown in FIG. 5, the control logic 551 functions as a switch to connect the middle node of the stacked capacitors to a voltage level Vinit when the charge pump circuit 521 is in one power state (e.g., low power state) and disconnects the middle node of the stacked capacitors from the voltage level Vinit when the charge pump circuit is in another power state (e.g., high power), based upon a control signal 555. In one embodiment, the control signal 555 is set to a first level (e.g., a positive voltage level) when the charge pump circuit is in a first state (e.g., power down, standby, etc.) and set to a second level (e.g., ground level) when the charge pump circuit 521 is in a second state (e.g., active). In this embodiment, the control device 551 is switched on when the control signal 555 is set to the first level (e.g., a positive voltage level) to connect the middle node of the stacked capacitors to the voltage source Vinit. The control device 551 is switched off when the control signal 555 is set to the second level (e.g., ground level) to disconnect or isolate the middle node from the voltage Vinit. Alternatively, the voltage Vinit can also function as the control signal 555 to turn the control device 551 on or off thus eliminating the need of having the separate control signal 555.

Figure 6:
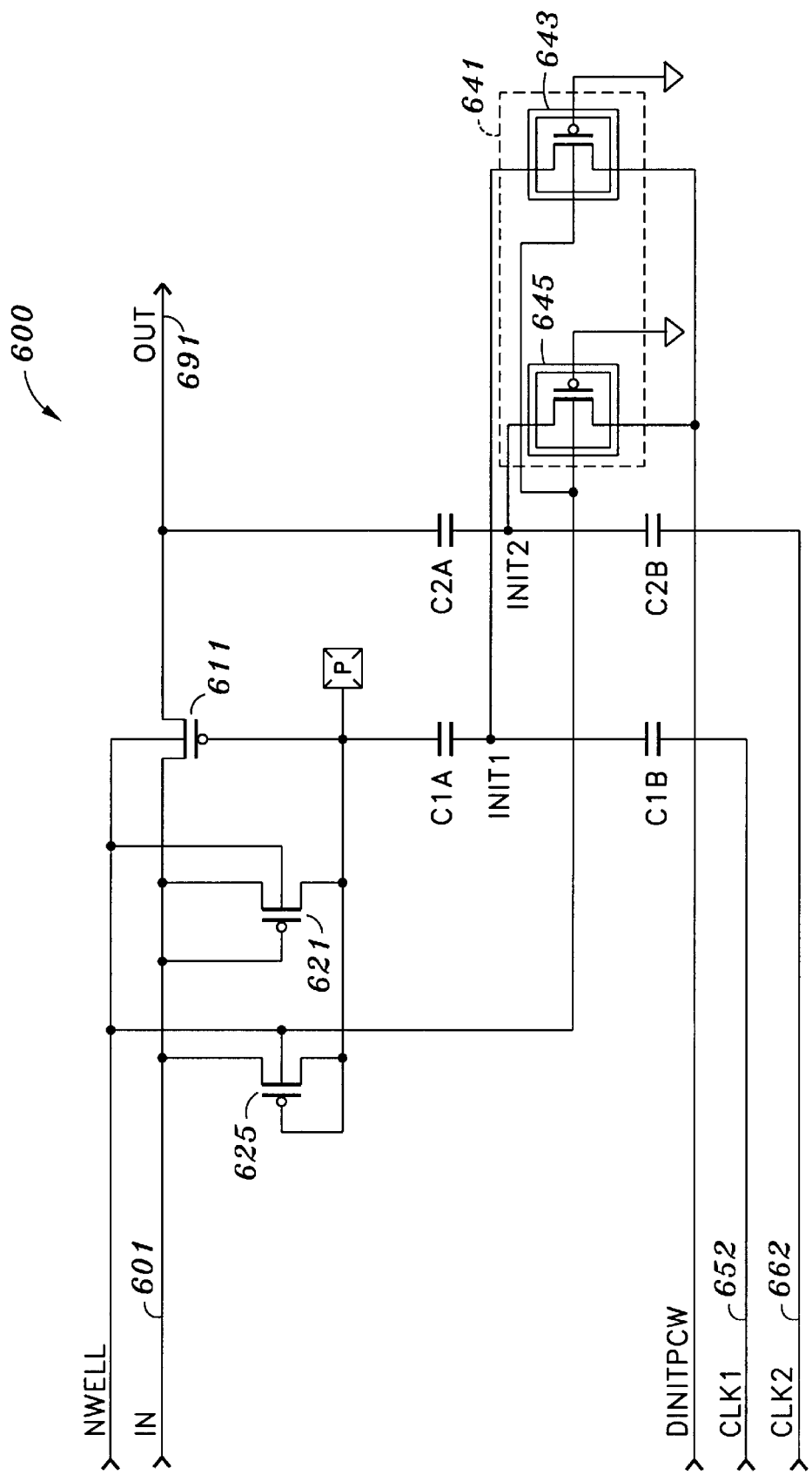
FIG. 6 illustrates a circuit diagram of one embodiment of a charge pump stage having a stacked capacitor configuration.

FIG. 6 shows a circuit diagram of one embodiment of a charge pump stage 600 in a negative charge pump circuit that implements a stacked capacitor configuration according to the teachings of the present invention. The charge pump stage 600, in one embodiment, includes an input node 601 and an output node 691. The input node 601 is coupled to the output node of a preceding pump stage (not shown). In this example, it is assumed that the charge pump stage 600 is the final pump stage in the negative charge pump circuit and therefore the output node 691 is coupled to a flash memory device even though everything discussed herein should equally apply where the charge pump stage 600 is not the final stage of the charge pump circuit and thus the output node 691 is coupled to the input node of a next pump stage. The charge pump stage 600 includes a switching transistor 611. The switching transistor, in one embodiment, is P type field effect transistor even though P' type devices may also be used. The source and the drain terminals of the switching transistor 611 are coupled to the input node 601 and the output node 691, respectively. The charge pump stage 600 also includes pull-down transistor 621. The pull-down transistor 621, in one embodiment, is a P' type field effect transistor even though P type devices can also be used. P' type devices have lower threshold voltage levels than P type devices. The drain terminal of the pull-down transistor 621 is connected to the gate terminal of the switching transistor 611. In this embodiment, the pull-down transistor 621 is diode connected with the source terminal and the gate terminal of the pull-down transistor 621 being connected to the source terminal of the switching transistor 611. The charge pump stage 600 also includes a pull-up transistor 625. The pull-up transistor 625, in one embodiment, is a P type field effect transistor. The source terminal of the pull-up transistor 625 is connected to the source terminal of the switching transistor 611. In this embodiment, the pull-up transistor 625 is diode connected with the drain terminal and the gate terminal of the pull-up transistor 625 being connected to the gate terminal of the switching transistor 611.

As shown in FIG. 6, the charge pump stage 600 includes a stacked capacitor configuration using two capacitors C2A and C2B connected in series to reduce the stress across each individual capacitor. In the present embodiment, the voltage level at node 691 can reach a certain negative voltage level (e.g., −15 volts) which would exceed the stress limitation or breakdown voltage level of a single ONO or MOS capacitor. In this embodiment, the capacitors C2A and C2B are ONO capacitors which can withstand less stress than MOS capacitors but have smaller die area. The ONO capacitors are used in this stacked capacitor configuration since they have smaller die area but are still able to withstand the stress when they are connected in series as shown. The storage capacitors C2A and C2B are connected in series between the drain terminal of the switching transistor 611 and a clock signal CLK2 (662). The first end of the storage capacitor C2A is connected to the drain terminal of the switching transistor 611 (which is also coupled to the output node of the charge pump stage 600). The second end of the storage capacitor C2A is connected to the first end of the storage capacitor C2B. The second end of the storage capacitor C2B is connected to the clock signal CLK2 (662).

The embodiment shown in FIG. 6 also includes a stacked capacitors configuration having two boot node capacitors C1A and C1B connected in series between the gate of the switching transistor 611 and a clock signal CLK1 (652). In this embodiment, C1A and C1B are ONO capacitors. The ONO capacitors are used in this stacked configuration since they have smaller die area but are still able to withstand the stress when they are connected in series as shown. The first end of the C1A capacitor is connected to the gate terminal of the switching capacitor 611 and the second end of the C1A capacitor is connected to the first end of the C1B capacitor. The second end of the C1B capacitor is connected to the clock signal CLK1 (652).

As shown in FIG. 6, the charge pump stage 600 includes a control device 641 that functions as a switch to control the voltage level at the intermediate nodes INIT1 and INIT2 to solve the transient stress problem described above when the charge pump circuit transitions from one power state (e.g., a active, running, etc.) to another power state (e.g., shut down, powered off, standby, etc.). In this embodiment, the voltage level at the output node 691 can go from a certain negative voltage level (e.g., −15 volts) when the charge pump circuit is running to a certain positive voltage level (e.g., +11 volts) when the charge pump circuit is shut down and gets initialized to a proper voltage level, for example +5 volts. The control device 641, in one embodiment, includes two P type field effect control transistors 643 and 645 although P' type devices can also be used. The drain terminal of the control transistor 643 is connected to the intermediate node INIT1. The gate terminal of the control transistor 643 is connected to ground. The source terminal of the control transistor 643 is connected to a control voltage level referred to as DINITPCW in the present discussion. The drain terminal of the control transistor 645 is connected to the intermediate node INIT2. The gate terminal of the control transistor 645 is connected to ground. The source terminal of the control transistor 645 is connected to the control voltage level DINITPCW. The operations of the control transistors 643 and 645 are described in more detail below.

Figure 7:
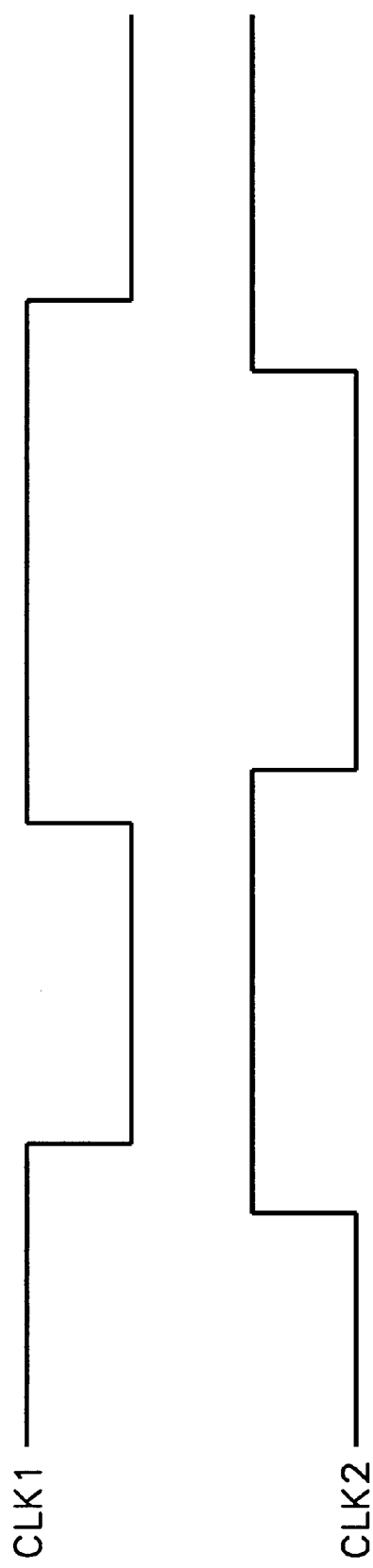
FIG. 7 shows an example of a timing diagram of various clock signals used in connection with the charge pump stage in FIG. 6.

FIG. 7 shows an example of a timing diagram of the clock signals 652 and 662 that are used in connection with the charge pump stage 600. In one embodiment, the clock signals 652 and 662 are at Vcc during high phase and ground during low phase. When the clock signal 652 goes low, the switching transistor 611 is turned on and the charge stored at the input node 601 is transferred to the storage capacitors C2A and C2B. The diode connected pull-up transistor 625 functions to prevent back flow from the output node 691 to the input node 601 when the voltage level at the output node 691 is more negative than the voltage level at the input node 601. As mentioned above, in this embodiment, the output voltage level at the output node 691 is about −15 volts when the charge pump circuit is active. In this embodiment, the capacitance of C2A is about the same as the capacitance of C2B. As a result, the voltage level at the output node 691 (e.g., −15 volts) is split about equally across capacitors C2A and C2B. Therefore the voltage across C2A is about −7.5 volts when the circuit is running. Likewise, the voltage across C2B is also about −7.5 volts when the circuit is running. In other words, the voltage level at the intermediate nodes INIT1 and INIT2 is at about −7.5 volts when the circuit is running. It can be seen from this example that the voltage across each capacitor connected in series is reduced below the stress limitation or breakdown voltage level of a single capacitor used in the circuit (e.g., −12.5 volts for ONO capacitors).

In one embodiment, when the charge pump circuit is running, both the NWELL and the DINITPCW are set to ground level to turn off the control transistors 643 and 645 thus disconnecting or isolating the intermediate nodes INIT1 and INIT2 from the voltage DINITPCW. In one embodiment, when the charge pump circuit is shut down, the NWELL and the DINITPCW are set to a positive voltage level causing the control transistors 643 and 645 to turn on thus connecting the intermediate nodes INIT1 and INIT2 to the DINITPCW voltage. In one embodiment, the DINITPCW is set to the same voltage level as the output node 691 when the charge pump circuit is shut down. By controlling the voltage level at the intermediate nodes INIT1 and INIT2 through the control transistors 643 and 645, the transient stress problem that would occur when the charge pump circuit transitions from one state (e.g., running) to another state (e.g., shut down) is solved.

Figure 8:
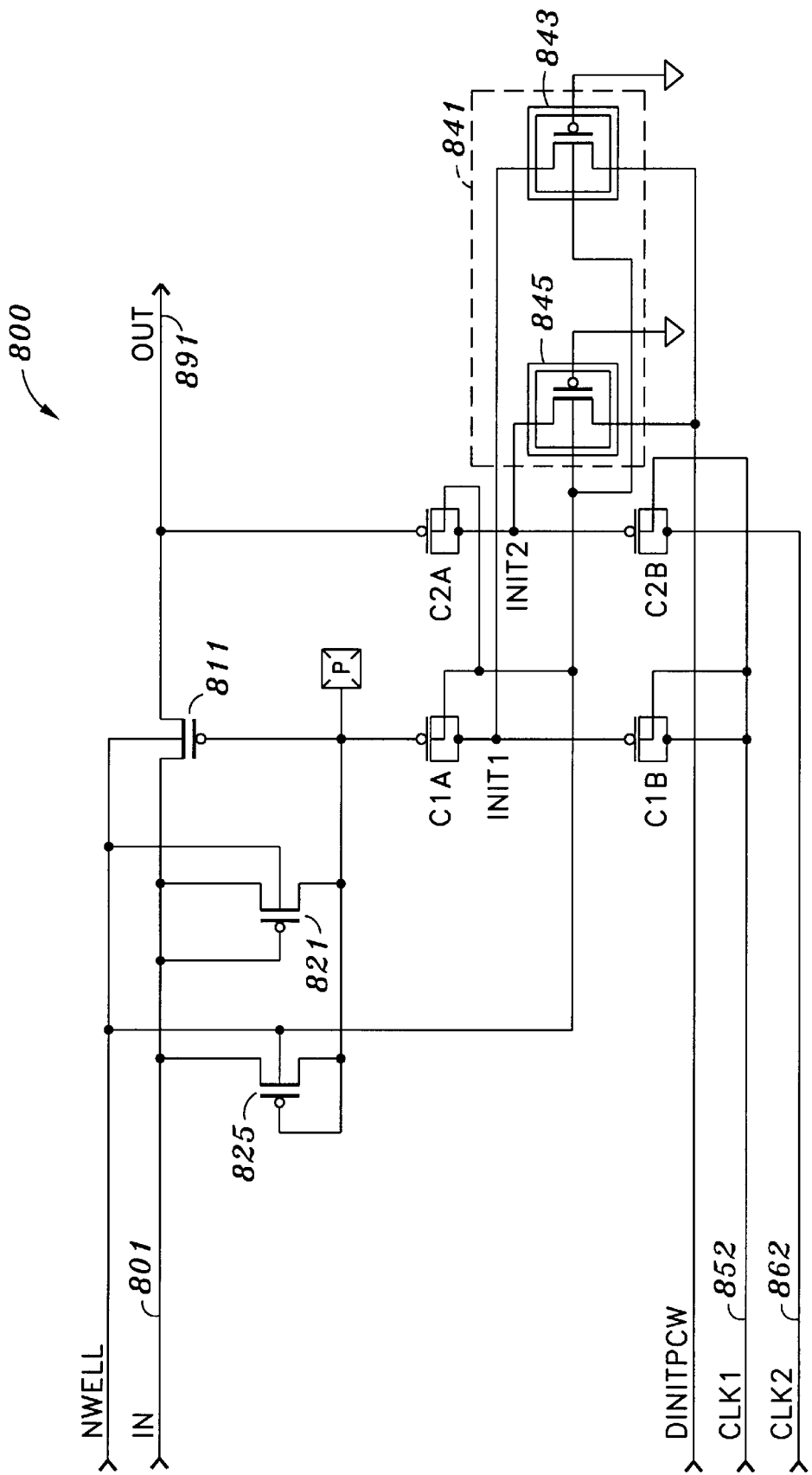
FIG. 8 shows a circuit diagram of one embodiment of a charge pump stage having a stacked capacitor configuration.

FIG. 8 shows a circuit diagram of one embodiment of a charge pump stage 800 using a stacked capacitor configuration with MOS capacitors instead of ONO capacitors. The functions and operations of the charge pump stage 800 are basically the same as those described above with respect to the charge pump stage 600. The MOS storage capacitors C2A and C2B are connected in series to reduce the stress level across each individual capacitor. Likewise, the boot node capacitors C1A and C1B are connected in series to reduce the stress level across C1A and C1B. The control device 841 is used as a switch to connect the intermediate nodes INIT1 and INIT2 to the voltage DINITPCW when the charge pump circuit is in one power state (e.g., shut down) and to disconnect or isolate the intermediate nodes INIT1 and INIT2 from the voltage DPINITPCW when the charge pump circuit is in another state (e.g., running). The control device 841, in one embodiment, includes two P type field effect control transistors 843 and 845 although P' type devices can also be used. The drain terminal of the control transistor 843 is connected to the intermediate node INIT1. The gate terminal of the control transistor 843 is connected to ground. The source terminal of the control transistor 843 is connected to a control voltage level referred to as DINITPCW in the present discussion. The drain terminal of the control transistor 845 is connected to the intermediate node INIT2. The gate terminal of the control transistor 845 is connected to ground. The source terminal of the control transistor 845 is connected to the control voltage level DINITPCW. The operations of the control transistors 843 and 845 are basically the same as described above with respect to control transistors 643 and 645.

Figure 9:
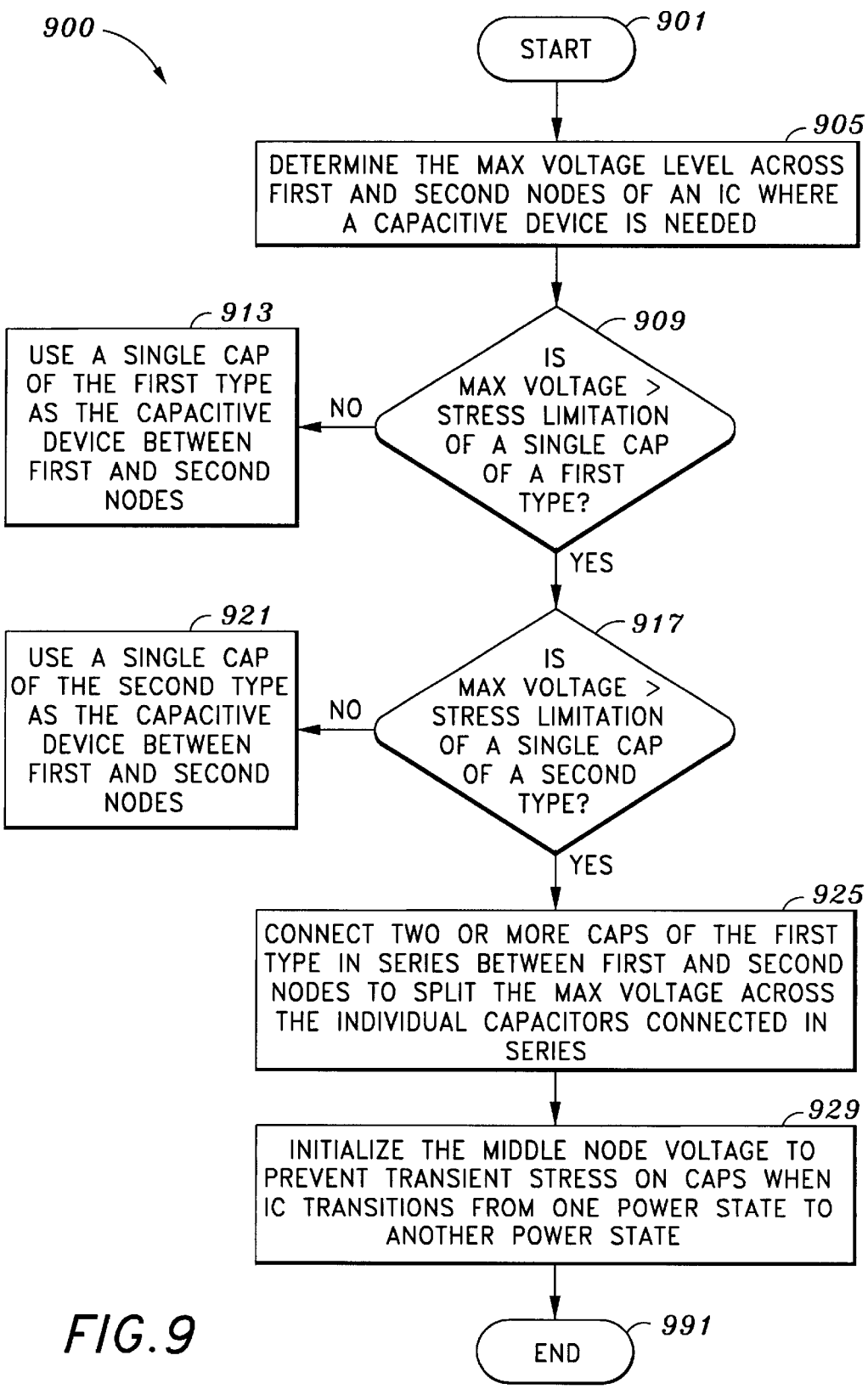
FIG. 9 shows a flow diagram of one embodiment of a method for reducing stress across capacitors used in an integrated circuit.

FIG. 9 illustrates a flow diagram of one embodiment of a method 900 for reducing stress across capacitors used in an integrated circuit. It is assumed in the present discussion that the integrated circuit requires at least one capacitive device to be connected between two nodes (e.g., a first node and a second node) in the integrated circuit. It is also assumed for the purposes of explanation and illustrations that there are two different types of capacitors available for use as the capacitive device between the first and second nodes. One of the two types is referred to as type one capacitor (first type) while the other type is referred to as type two capacitor (second type). It is assumed in this embodiment that type two capacitors can withstand more stress than type one capacitors but have larger die area than type one capacitors. In one embodiment, the type one capacitors are ONO capacitors and the type two capacitors are MOS capacitors. As described above, MOS capacitors can withstand more stress compared with ONO capacitors. However, MOS capacitors occupy more die area. The method 900 starts at block 901 and proceeds to block 905. At block 905, the maximum voltage level between the first node and the second node is determined. The method 900 then proceeds to block 909. At decision block 909, the method 900 proceeds to block 913 if the maximum voltage determined at block 905 does not exceed the stress limitation of a single type one capacitor (e.g., ONO). Otherwise, the method proceeds to block 917. At block 913, a single type one capacitor is used as the capacitive device between the first and second nodes since the maximum voltage does not exceed the stress limitation of a single type one capacitor. At decision block 917, the method 900 proceeds to block 921 to use a single type two capacitor as the capacitive device between the first and second nodes if the maximum voltage level does not exceed the stress limitation or the breakdown voltage level of a single type two capacitor. Otherwise the method 900 proceeds to block 925. At block 925, since the maximum voltage level across the first and second nodes exceeds both the stress limitation of a single type one capacitor and the stress limitation of a single type two capacitor, a stacked configuration having two or more capacitors will be needed to reduce the stress level across each individual capacitor. In this example, it is assumed that two capacitors of either type one or type two will be sufficient to withstand the maximum voltage between the first and second nodes. If two capacitors connected in series are not sufficient to withstand the stress, the stacked capacitor configuration can include more capacitors as needed. Since type one capacitors have smaller die area than type two capacitors, it is preferable to use type one capacitors in the stacked configuration if they can withstand the stress. At block 925, two or more type one capacitors are connected in series between the first and second nodes to split the maximum voltage level across the individual capacitors. As explained above, the voltage split will be as follows:

$$V=V1+V2$$

Where V is the maximum voltage across the first and second nodes, V1 is the voltage across the first capacitor and V2 is the voltage across the second capacitor in the stacked capacitor configuration. In one embodiment, the first and second capacitors have the same capacitance and therefore V1=V2.

The method then proceeds from block 925 to block 929. At block 929, to prevent the transient stress that can occur when the integrated circuit transitions from a high power state (e.g., active, full power, running, etc.) to a low power state (e.g., shut down, powered off, standby, etc,) the middle node between the first and second capacitors connected in series is set to a control voltage level that is sufficient to reduce the transient stress when the integrated circuit transitions to the low power state. When the circuit is in the high power state (e.g., active), the middle node is disconnected or isolated from the control voltage level. In one embodiment, as described above, a control device such as a switching transistor can be used to connect the middle node to or disconnect the middle node from the control voltage level, based upon the particular power state of the integrated circuit. The method 900 then proceeds to end at block 991.

Figure 10:
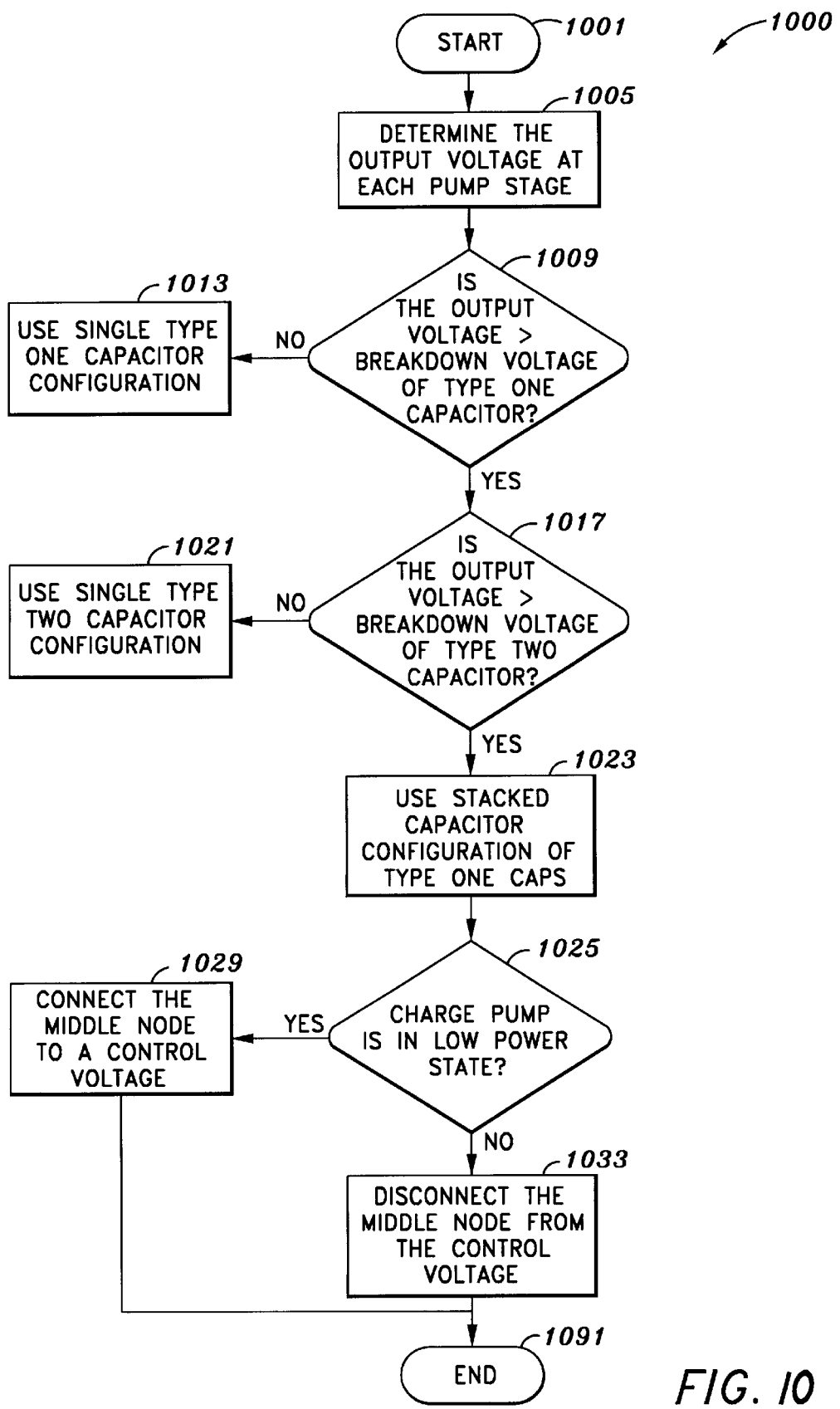
FIG. 10 is a flow diagram of one embodiment of a method for balancing system performance requirements including output voltage requirements with other system constraints including capacitor stress limitation and die area of an integrated circuit.

FIG. 10 shows a flow diagram of a method 1000 for balancing the system performance requirements (e.g., output voltage requirement) with the system constraints (e.g., die area, stress limitations of capacitors) in a charge pump circuit. The charge pump circuit in this embodiment includes a plurality of pump stages connected in series. Each pump stage includes an input node and an output node. The output node of each stage is coupled to the input node of a next stage. The input node of the first pump stage is coupled to a power supply to receive an input voltage. The output node of the last stage is coupled to a device that requires a higher voltage level than that provided by the power supply (e.g., a flash memory device). Again, it is assumed for the purposes of explanation and illustrations that there are two different types of capacitors (e.g., type one and type two) available for use as the storage and boot node capacitors in the charge pump circuit. It is assumed in this embodiment that type two capacitors can withstand more stress than type one capacitors but have larger die area than type one capacitors. In one embodiment, the type one capacitors are ONO capacitors and the type two capacitors are MOS capacitors. MOS capacitors can withstand more stress compared with ONO capacitors. However, MOS capacitors occupy more die area. The method 1000 starts at block 1001 and proceeds to block 1005. At block 1005, the voltage level at the output node of each pump stage in the charge pump circuit is determined. At decision block 1009, the method 1000 proceeds to block 1013 if the output voltage level at the respective output node does not exceed the stress limitation or the breakdown voltage level of a single type one (e.g., ONO) capacitor. Otherwise the method 1000 proceeds to decision block 1017. At block 1013, a single type one (ONO) capacitor is used as the storage capacitor since it can withstand the stress. A single type one (ONO) capacitor is also used as the boot node capacitor. At decision block 1017, the method 1000 proceeds to block 1021 if the output voltage at the respective output node does not exceed the stress limitation of a single type two capacitor (e.g., MOS capacitor). Otherwise the method 1000 proceeds to block 1023. At block 1021, a single type two capacitor (e.g., MOS capacitor) is used as the storage capacitor and a single type two capacitor is also used as the boot node capacitor in the respective pump stage. At block 1023, since the output voltage at the respective output node exceeds the stress limitation of both a single type one and a single type two capacitor, a stacked capacitor configuration including two or more capacitors connected in series is needed to reduce the voltage across each individual capacitor. In this embodiment, a stacked capacitor configuration using type one capacitors is used since type one capacitors have smaller die area than type two capacitors. The number of type one capacitors to be connected in series in the stacked configuration depends upon the maximum voltage level at the respective output node. In this example it is assumed that two capacitors connected in series are sufficient. In one embodiment, the capacitors connected in series have the same capacitance to split the voltage equally across the individual capacitors. The method then proceeds from block 1023 to block 1025. At block 1025, to prevent the transient stress that can occur when the charge pump circuit transitions from one power state (e.g., full power, running, etc.) to another power state (e.g., shut down, powered off, standby, etc,) the middle node between the first and second capacitors connected in series is set to a control voltage level that is sufficient to reduce the transient stress when the integrated circuit transitions from a high power state to a low power state. In one embodiment, as explained above, the output node of at least the final stage in the charge pump circuit can go from a negative voltage level (e.g., −15 volts) when the charge pump circuit is running to a positive voltage level (e.g., +11 volts) when the charge pump circuit is shut down and then gets initialized to a proper voltage level, for example +5 volts. When this transition occurs, the total voltage sweep or the transient stress is 26 volts which exceeds the stress limitation of the capacitors even in the stacked configuration. To prevent this transient stress, the voltage level at the middle node between the two capacitors connected in series is dynamically controlled as described above. At decision block 1025, the method 1000 proceeds to block 1029 if the charge pump circuit is in a low power state (e.g., shut down). Otherwise, the method 1000 proceeds to block 1033. At block 1029, the middle node is connected to a control voltage level that is sufficient to reduce the transient stress below the stress limitation of the capacitors. At block 1033, the middle node is disconnected or isolated from the control voltage level. In one embodiment, as described above, a control device such as a switching transistor can be used to connect the middle node to or disconnect the middle node from the control voltage level, based upon the current state of the charge pump circuit (e.g., whether it is shut down or running). The method 1000 then proceeds to end at block 1091.

The invention has been described in conjunction with the preferred embodiment. It is evident that numerous alternatives, modifications, variations and uses will be apparent to those skilled in the art in light of the foregoing description.

What is claimed is:

1. A method of controlling the voltage levels across capacitors coupled between a first node and a second node of an integrated circuit so that the voltage levels across these capacitors will not exceed the breakdown voltage limitation of these capacitors, the voltage level between the first and second nodes varying from a second voltage level to a first voltage level when the integrated circuit transitions from a second power state to a first power state, the first power state corresponds to a low power state and the second power state corresponds to a high power state, the method comprising:

connecting in series a first capacitor and second capacitor between the first and second nodes of the integrated circuit forming a middle node between the first and second capacitors; and setting the voltage level of the middle node to a third voltage level when the integrated circuit is placed in the first power state such that the voltage level between the first and middle nodes does exceed the breakdown voltage of the first capacitor and the voltage level between the middle and second nodes does not exceed the breakdown voltage of the second capacitor.

2. The method of claim 1 wherein setting the voltage level of the middle node comprises:

connecting the middle node to a voltage source corresponding to the third voltage level in response to a control signal indicating that the integrated circuit is placed in the first power state.

3. The method of claim 2 further comprising:

disconnecting the middle node from the voltage source in response to the control signal indicating that the integrated circuit is placed in the second power state.

4. The method of claim 3 wherein the control signal is set to a first value if the integrated circuit is in the first power state and set to a second value if the integrated circuit is in the second power state.

5. The method of claim 3 wherein connecting the middle node to the voltage source comprises:

turning on a switching device to connect the middle node to the voltage source.

6. The method of claim 5 wherein disconnecting the middle node from the voltage source comprises:

turning off the switching device to disconnect the middle node from the voltage source.

7. The method of claim 6 wherein the switching device comprises a transistor.

8. The method of claim 1 wherein the first and second capacitors are selected from the group consisting of oxide-nitride-oxide (ONO) capacitors and metal-oxide-semiconductor (MOS) capacitors.

9. The method of claim 1 wherein the capacitance of the first capacitor is approximately equal to the capacitance of the second capacitor.

10. A method of controlling the voltage levels across capacitors coupled between a first node and a second node of an integrated circuit so that the voltage levels across these capacitors will not exceed the breakdown voltage limitation of these capacitors, the voltage level between the first and second nodes varying from a second voltage level to a first voltage level when the integrated circuit transitions from a second power state to a first power state, the method comprising:

connecting in series a first capacitor and second capacitor between the first and second nodes of the integrated circuit forming a middle node between the first and second capacitors; and setting the voltage level of the middle node to a third voltage level when the integrated circuit is placed in the first power state such that the voltage level between the first and middle nodes does exceed the breakdown voltage of the first capacitor and the voltage level between the middle and second nodes does not exceed the breakdown voltage of the second capacitor, the third voltage level at the middle node corresponds to the voltage level at the first node when the integrated circuit is placed in the first power state.

11. The method of claim 10 wherein the middle node is connected to the first node via a switching device when the integrated circuit is placed in the first power state.

12. The method of claim 11 wherein the middle node is disconnected from the first node via the switching device when the integrated circuit is placed in the second power state.

13. The method of claim 12 wherein the switching device is turned on in response to a control signal indicating that the integrated circuit is in the first power state and turned off in response to the control signal indicating that the integrated circuit is in the second power state.

14. The method of claim 13 wherein the switching device comprises a transistor.

15. In a charge pump having a plurality of pump stages connected in series, at least one of the pump stages including at least one node to be coupled to a corresponding clock signal via a capacitive device, the at least one node having a first voltage when the charge pump is in a first power state and a second voltage when the charge pump is in a second power state, a method of balancing the voltage requirement at the at least one node with the stress limitation and die area of the capacitive device, the method comprising:

using a single capacitor of a first type as the capacitive device between the at least one node and the corresponding clock signal if the first voltage and second voltage do not exceed the stress limitation of the single capacitor of the first type;

if the second voltage exceeds the stress limitation of the single capacitor of the first type, using a single capacitor of a second type as the capacitive device between the at least one node and the corresponding clock signal if the first voltage and second voltage do not exceed the stress limitation of the single capacitor of the second type, the single capacitor of the second type having greater stress limitation and greater die area than the single capacitor of the first type; and if the second voltage exceeds the stress limitation of the single capacitor of the second type, using two capacitors of the first type connected in series as the capacitive device between the at least one node and the corresponding clock signal if the first voltage and second voltage do not exceed the combined stress limitation of the two capacitors of the first type; and if the first voltage exceeds the combined stress limitation of the two capacitors of the first type, setting the middle node between the two capacitors of the first type to a third voltage level when the charge pump is in the first power state such that the voltage across each of the two capacitors does not exceed the stress limitation of the respective capacitor, the third voltage level at the middle node corresponds to the voltage level at the first node when the charge pump is placed in the first power state.

16. The method of claim 15 wherein setting the middle node between the two capacitors to the third voltage level comprises:

connecting the middle node to a voltage source corresponding to the third voltage level via a switching device in response to a control signal indicating that the charge pump is placed in the first power state.

17. The method of claim 15 further comprising:

disconnecting the middle node from the voltage source corresponding to the third voltage level via the switching device in response to the control signal indicating that the charge pump is placed in the second power state.

18. A charge pump circuit including a plurality of pump stages being connected in series each having an input node and an output node, at least one of the pump stages comprising:

a switching transistor having a gate, a first terminal, and a second terminal, the first terminal being coupled to the input node of the respective pump stage and the second terminal being coupled to the output node of the respective pump stage;

a first capacitor having a first end and a second end, the first end of the first capacitor being coupled to the gate of the switching transistor;

a second capacitor having a first end and a second end, the first end of the second capacitor being coupled to the second end of the first capacitor forming a first intermediate node, the second end of the second capacitor being coupled to a first clock signal;

a third capacitor having a first end and a second end, the first end of the third capacitor being coupled to the output node of the respective pump stage; and a fourth capacitor having a first end and a second end, the first end of the fourth capacitor being coupled to the first end of the third capacitor forming a second intermediate node, the second end of the fourth capacitor being coupled to a second clock signal wherein the first and second intermediate nodes are set to a predetermined voltage level when the charge pump circuit is placed in a low power state.

19. The charge pump circuit of claim 18 wherein the first and second intermediate nodes are set to the predetermined voltage level via a switching device in response to a control signal indicating that the charge pump circuit is placed in the low power state.

20. The charge pump circuit of claim 19 wherein the switching device comprises a first control transistor and a second control transistor, the first and second control transistors being turned on in response to the control signal indicating that the charge pump circuit is placed in the low power state to connect the first intermediate and second intermediate nodes, respectively, to a voltage source corresponding to the predetermined voltage level.

21. The charge pump circuit of claim 20 wherein the voltage source is set to a first voltage level to turn on the first and second control transistors when the charge pump circuit is placed in the low power state and to a second voltage level to turn off the first and second control transistors when the charge pump circuit is placed in a high power state.

22. A charge pump stage in a charge pump circuit, the charge pump stage comprising:

a first switching transistor having a gate, a first terminal and a second terminal, the first terminal being coupled to an input node of the charge pump stage, the second terminal being coupled to an output node of the charge pump stage;

at least two capacitors connected in series between the gate of the first switching transistor and a first clock signal forming a first intermediate node between the two capacitors;

at least two capacitors connected in series between the output node and a second clock signal forming a second intermediate node between the two capacitors;

a control device to connect the first and second intermediate nodes to a first voltage source when the charge pump circuit is in a first power state and to disconnect the first and second intermediate nodes from the first voltage source when the charge pump circuit is in a second power state;

a first diode having an input terminal and an output terminal, the input terminal being coupled to the first terminal of the first switching transistor and the output terminal being coupled to the gate of the first switching transistor; and a second diode having an input terminal and an output terminal, the input terminal being coupled to the gate of the first transistor, the output terminal being coupled to the first terminal of the first switching transistor.

23. The charge pump stage of claim 22 wherein the control device comprises a first control transistor and a second control transistor, the first and second control transistors being turned on in response to a control signal indicating that the charge pump circuit is in the first power state, the first and second control transistors being turned off in response to the control signal indicating that the charge pump circuit is in the second power state.

24. The charge pump stage of claim 23 wherein the first voltage source is used as the control signal, the first voltage source being set to a first value when the charge pump circuit is in the first power state and being set to a second value when the charge pump circuit is in the second power state.

* * * * *